United States Patent [19]
Kahn

[11] Patent Number: 4,819,268
[45] Date of Patent: Apr. 4, 1989

[54] TRANSMITTER HAVING MEANS FOR CONTROLLING UNDESIRED OUT-OF-BAND RADIATION

[76] Inventor: Leonard R. Kahn, 137 E. 36th St., New York, N.Y. 10016

[21] Appl. No.: 85,684

[22] Filed: Aug. 17, 1987

[51] Int. Cl.$^4$ .............................................. H04N 5/00
[52] U.S. Cl. ...................................... 381/14; 455/126
[58] Field of Search ....................... 381/14, 16, 2, 3, 4; 455/103, 126

[56] References Cited
U.S. PATENT DOCUMENTS
4,593,402  6/1986  Parker ..................................... 381/16

FOREIGN PATENT DOCUMENTS
0568139  12/1958  Canada ................................. 455/126
1094338   5/1955  France ................................. 455/126

Primary Examiner—Forester W. Isen
Attorney, Agent, or Firm—E. A. Onders

[57] ABSTRACT

An improved transmitter having protection from undesired out-of-band radiation caused by high frequency components in a supplied signal to be transmitted uses means for determining when the supplied signal is such as to cause out-of-band radiation. A resulting control signal then reduces the amplitude of the higher frequency components of the supplied signal relative to the remainder of the signal, thereby preventing out-of-band radiation.

7 Claims, 2 Drawing Sheets

TRANSMITTER HAVING MEANS FOR CONTROLLING UNDESIRED OUT-OF-BAND RADIATION

FIELD OF THE INVENTION

The present invention relates to amplitude modulation (AM) transmitters.

BACKGROUND OF THE INVENTION

In the United States, the Federal Communications Commission (FCC) has established regulatory standards for the broadcast of amplitude-modulation (AM) signals in the AM broadcast band (535-1605 kiloHertz). Included in its regulations is one specifying the bandwidth which an AM signal is permitted to occupy, and setting limits for the permissible amount of radiation which may be emitted at frequencies outside the allocated bandwidth. The purpose of this regulation is to prevent each AM station from interfering with the service areas of stations operating at assigned frequencies above and below that station. Compliance with FCC regulations in this respect has required diligence on the part of AM broadcasters and manufacturers of AM broadcast transmitting equipment.

The problem of undesired out-of-band radiation has been compounded with the advent of AM stereo broadcasting. In March 1982 the FCC adopted its unique Report and Order authorizing the so-called "marketplace approach" to the selection of a standard for the broadcast of stereophonic program material in the AM band. In the various AM stereo systems competing in the marketplace, stereo sum information (L+R) is transmitted as amplitude modulation of the carrier, while stereo difference information (L−R) is transmitted as phase modulation of the carrier. The addition of (L−R) information carried in the phase (or quadrature) modulation, particularly for higher-frequency components of L−R, has resulted in an increase in the amount of out-of-band radiation, as compared to monaural AM broadcasting. Furthermore, some AM stereo systems inherently produce more out-of-band radiation than other such systems in the presence of strongly one-sided stereo modulation (L-only or R-only).

Others have recognized that certain AM stereo systems tend to produce more out-of-band radiation, thereby interfering with AM stations broadcasting on adjacent channels, and have attempted to address the problem by processing the L-R signal prior to transmission based on a prediction of when out-of-band radiation would occur (see U.S. Pat. Nos. 4,338,491 and 4,593,402, for example). However, the prediction methods used are generally unreliable and complex.

It is, therefore, an object of the present invention to provide improved automatic means for controlling the out-of-band radiation of an AM transmitter so as to comply with FCC, or other, prescribed limits.

SUMMARY OF THE INVENTION

In accordance with the present invention, there is provided an improved transmitter having protection from undesired out-of-band radiation caused by high frequency signal components in the signal to be transmitted. The transmitter includes first means for supplying a signal to be transmitted and second means, responsive to the supplied signal and to a supplied control signal for developing a modified supplied signal having a selected high frequency portion reduced in amplitude compared to the remainder of the supplied signal by an amount determined by said control signal. The transmitter also includes third means for developing a control signal representative of the undesired out-of-band radiation caused by transmission of the supplied signal and for supplying the control signal to the second means. Finally, the transmitter includes means for transmitting the modified supplied signal.

In accordance with another aspect of the present invention, the third means referred to above may include the series combination of a low power transmitter and an out-of-band radiation detector, with the low power transmitter being responsive to the supplied signal and the out-of-band detector developing the control signal.

For a better understanding of the present invention, together with other and further objects, reference is made to the following description, taken in conjunction with the accompanying drawings, and its scope will be pointed out in the appended claims.

DESCRIPTION OF THE INVENTION

Figure 1:
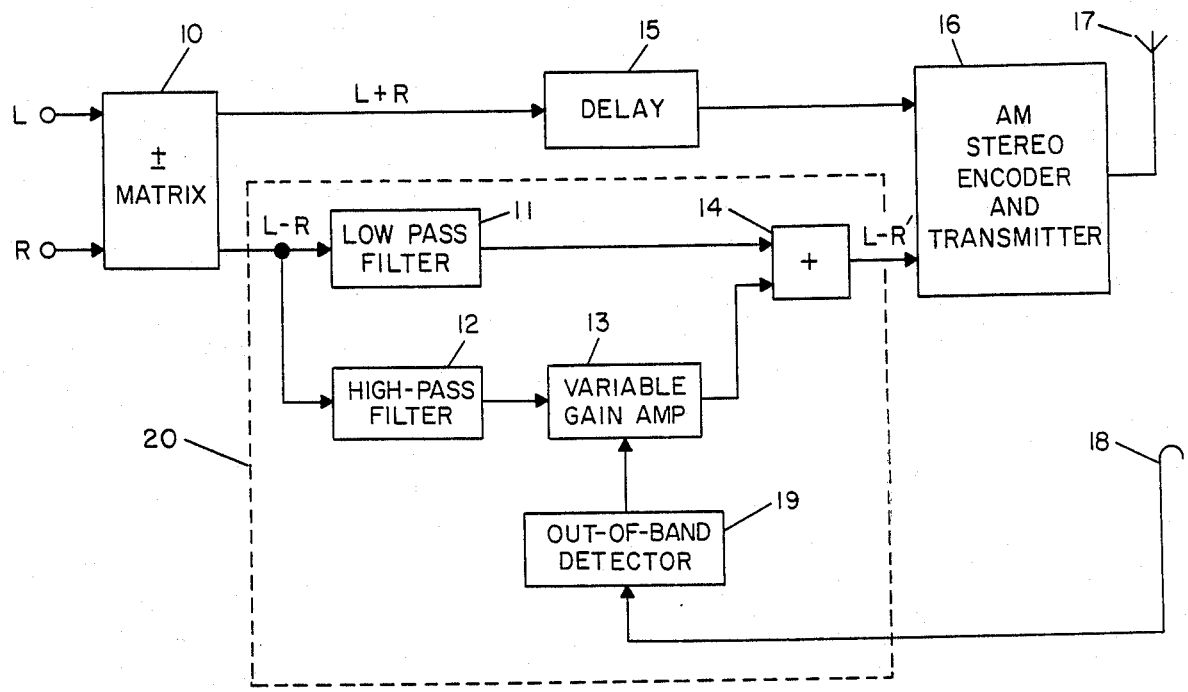
FIG. 1 shows a block diagram of an AM stereo transmitter embodying the present invention.

A block diagram of an AM stereo transmitter embodying the invention is shown in FIG. 1. Supplied left (L) and right (R) stereophonic audio-frequency input signals are coupled to the inputs of stereo matrix 10 as shown, where they are combined to form an L+R stereo sum signal and an L−R stereo difference signal.

Figure 2:
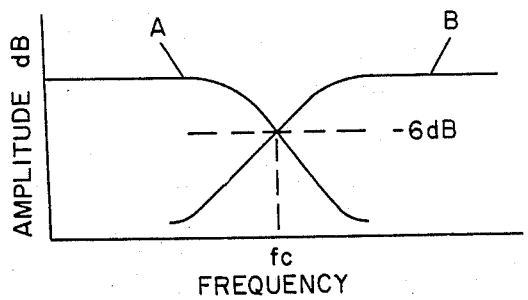
FIG. 2 shows typical amplitude vs frequency transfer characteristics of high-pass and low-pass filters used in the embodiment of FIG. 1.

The L−R signal is coupled to the inputs of lowpass filter 11 and high-pass filter 12. These filters have essentially equal 6 dB cutoff frequencies as shown in FIG. 2, where curve A represents the amplitude-vs-frequency response of low-pass filter 11 and curve B represents the amplitude vs frequency response of high-pass filter 12. The output of high-pass filter 12 is coupled to variable-gain amplifier 13, whose function will be described shortly. The outputs of variable gain amplifier 13 and low-pass filter 11 are coupled to adder circuit 14 where they are combined to form the (L−R) signal which is coupled to the L−R input of AM stereo encoding and transmitting unit 16. When variable-gain amplifier 13 operates at its maximum gain, the low-frequency and high-frequency L−R components applied to adder 14 are combined to produce an (L−R) output from adder 14 that has essentially the same amplitude-vs-frequency characteristic as the L−R signal coupled to the inputs of filters 11 and 12.

Delay circuit 15 in FIG. 1 may be required to equalize the delays in the L+R and L−R signal paths, since filters 11 and 12 in the L−R signal path may introduce sufficient delay to adversely affect stereo separation.

The L+R and (L−R) signals applied to the AM stereo encoder and transmitter unit 16 are encoded in accordance with a desired system of AM stereo transmission, such as the Kahn/Hazeltine Independent Sideband (ISB) system, and transmitted in accordance with the signal format for the AM stereo system being used to broadcast. The output of transmitter 16 is coupled to antenna 17.

A probe, 18, which picks up a signal representative of the signal radiated by transmitter 16, is coupled to the input of out-of-band detector 19. Out-of-band detector 19 is essentially a radio receiver which rejects the desired transmission of transmitter 10 (the desired transmission normally covers a frequency band ±15 kHz on either side of the carrier frequency) and receives and amplifies a predetermined bandwidth of undesired emissions from the transmitter on one or both sides of the desired band of emissions. For example, the out-of-band detector might be designed to receive emissions in the range of 15 kHz to 30 kHz above or below the transmitted carrier frequency, or both. In some instances, it may be necessary or desirable for the range to extend more than 30 kHz above or below the carrier in order to detect all significant out-of-band emissions from transmitter 16 which exceed the maximum specified limit and which interfere with the operation of AM stations operating on adjacent channels.

The signal picked up by probe 18 is band limited in out-of-band detector 19, and may, if required, be amplified. The out-of-band signal is then detected to provide a control signal for controlling the gain of variable gain amplifier 13. In the absence of undesired emissions from transmitter 16, no control signal is developed, and variable-gain amplifier 13 operates at a maximum gain. If, however, undesired emissions do occur, the control signal developed by out-of-band detector 19 acts to reduce the gain of variable-gain amplifier 13 sufficiently to cause the out-of-band emissions to be reduced in amplitude to a level at or below the specified maximum limit.

The cutoff frequency, $f_c$, for filters 11 and 12 in FIG. 1, and illustrated in FIG. 2, is chosen to enable the operation of the invention to keep out-of-band emissions from exceeding the specified maximum limit. Since AM stereo signals for some AM stereo systems inherently have more out-of-band emissions than others, the choice of filter cutoff frequency $f_c$ is, therefore, governed by the characteristics of the AM stereo system being used to broadcast. For example, for the Motorola system to handle 100% L-only or R-only modulation without any out-of-band emissions which exceed the FCC limit, the cutoff frequency, $f_c$ is approximately 3.75 kHz, whereas the corresponding required cutoff frequency for the Kahn/Hazeltine Independent Sideband AM stereo system is slightly below 7.5 kHz.

For convenience in describing other embodiments of the invention, units 11-14 and 19 in FIG. 1 will be referred to as control circuitry 20 (shown with a dotted box in FIG. 1).

Figure 3:
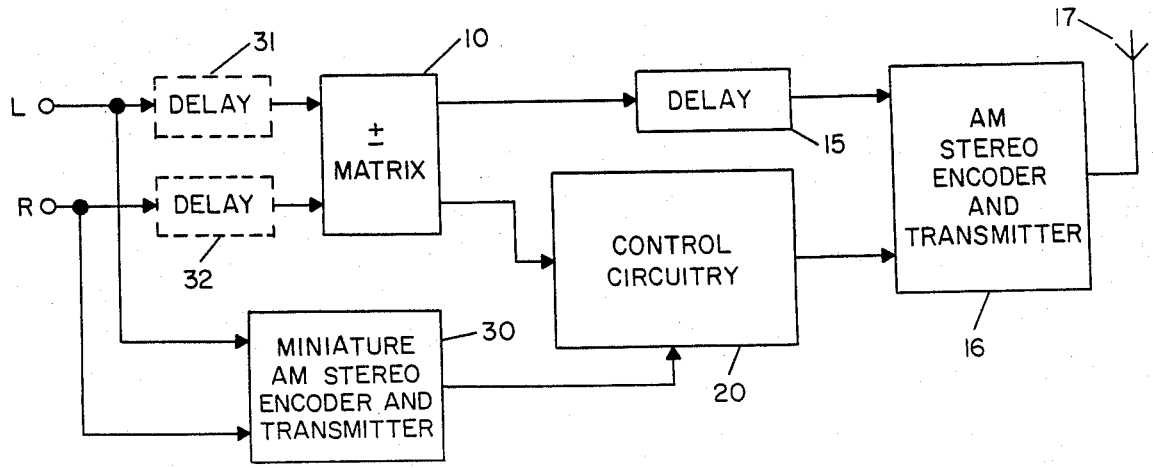
FIG. 3 shows a block diagram of another embodiment of the invention.

A preferred embodiment of the invention is shown in FIG. 3. In the embodiment of FIG. 1 there may be sufficient time delay in out-of-band detector 19 and variable-gain amplifier 13 to permit a brief transient of excessive out-of-band emission to occur before the control voltage applied to variable-gain amplifier 13 effects a reduction of the out-of-band emission to an acceptable level. The embodiment shown in FIG. 3 has provision for causing the control voltage applied to the variable-gain amplifier in control unit 20 to take effect before actual undesired transients of out-of-band emissions can occur.

In the FIG. 3 embodiment, units 10 through 17 and 19 function as previously described for the embodiment shown in FIG. 1. In FIG. 3 however, the signal applied to the out-of-band detector in control unit 20 is not derived from the output of transmitter 16. Instead, the L and R stereophonic input signals are coupled to an auxiliary low power stereo encoder and transmitter 30 which includes matrixing, AM Stereo encoding and a low power level AM stereo modulated RF output, and which, except for the lower power level, duplicates the broadcast signal output of main transmitter 16. Alternatively, unit 30 may be constructed to simulate the functions described using software, firmware or analog techniques instead of actual encoding and transmitter circuitry.

The output of auxiliary transmitter 30 is coupled to the out-of-band detector in unit 20 which develops a control signal that is used to reduce the high-frequency L-R gain of the variable-gain-amplifier in unit 20, and, thereby maintain out-of-band emissions from main transmitter 16 at or below the specified maximum limit.

In order to insure that the control of the variable-gain amplifier in unit 20 becomes effective soon enough to preclude the occurrence of transient out-of-band emissions from main transmitter 16, delay in the audio-frequency paths of the main transmitter may be required, as illustrated by the delay functions designated as blocks 31 and 32 in the L and R input signal paths in FIG. 3. The delays of these networks must be sufficient to provide gain reduction in the variable-gain amplifier in unit 20 prior to, or at least coincident with, the time at which excessive out-of-band emissions from main transmitter 16 would otherwise occur.

Delay networks, such as designated by blocks 31 and 32, are well known to persons skilled in the art. The dashed outlines of these blocks indicate that their position shown in the circuit is not critical. The necessary delay could be introduced instead in the L+R and L−R signal paths at the outputs of matrix 10 or the inputs of transmitter 16, for example. Furthermore, the L−R filters in unit 20, and the compensating L+R delay network 15 could be designed to introduce sufficient delay so as to eliminate the need for separate delay networks 31 and 32.

Figure 4:
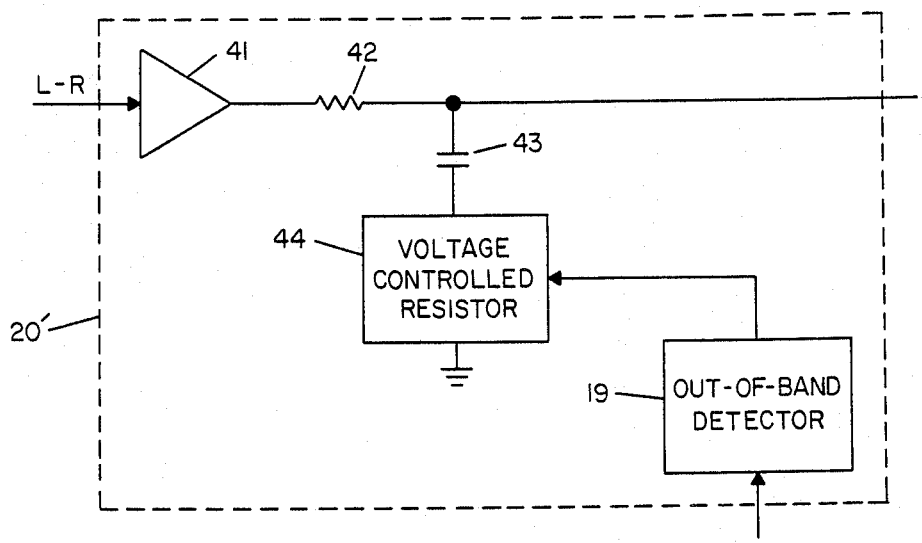
FIG. 4 shows a simplification which may be used in the embodiments of FIGS. 1 and 3.
Figure 5:
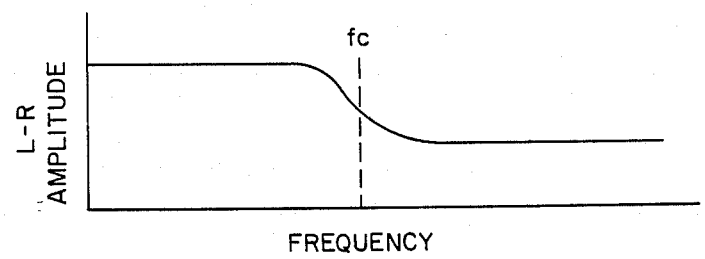
FIG. 5 shows a typical amplitude vs. frequency transfer characteristic for the variable higher frequency attenuator used in the FIG. 4 embodiment.

FIG. 4 shows a simplified control unit 20 which may be used in place of the control unit 20 shown in FIGS. 1 and 3. In FIG. 4, the combination of amplifier 41, resistor 42, capacitor 43 and voltage controlled resistor 44 forms a voltage controlled attenuator which attenuates only the selected higher frequencies of the input signal as shown in the diagram of FIG. 5.

Figure 6:
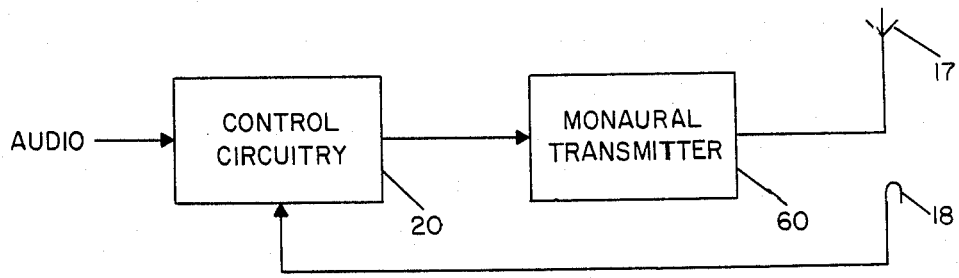
FIG. 6 shows a block diagram of a monaural transmitter embodying the present invention.
Figure 7:
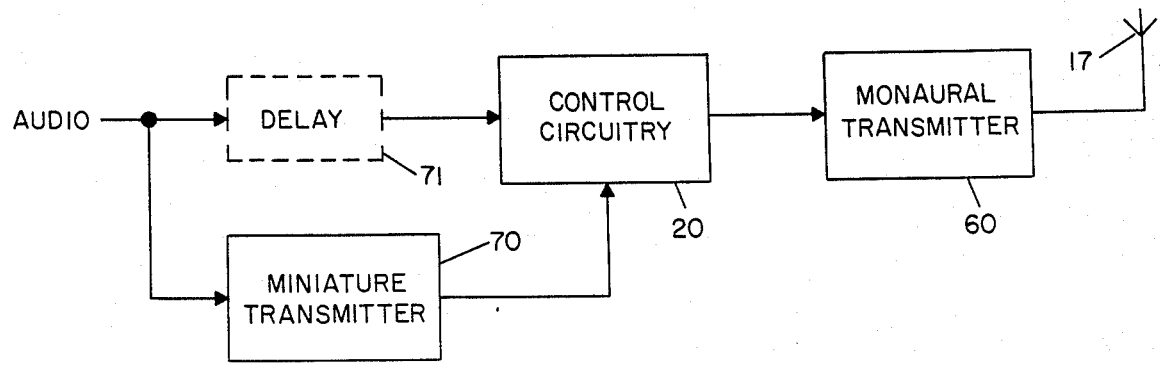
FIG. 7 shows a block diagram of another monaural embodiment of the invention.

While the embodiments described thus far have been in the environment of AM stereo transmitters, it should be recognized that the present invention is equally applicable for controlling out-of-band radiation from monaural transmitters, as will be seen from the embodiments shown in FIGS. 6 and 7. The monaural embodiments of FIGS. 6 and 7 correspond to the stereo embodiments shown in FIGS. 1 and 3, respectively, and operate in the same manner except that monaural transmitter 60 replaces stereo transmitter 16. Similarly, miniature monaural transmitter 70 replaces miniature stereo transmitter 30, and, like unit 30, may be simulated using software, firmware or analog circuitry instead of an actual miniature transmitter. The input signal to unit 20, in the case of the embodiments shown in Figs. 6 and 7, is a monaural audio signal instead of the L—R stereo signal used in the FIGS. 1 and 3 embodiments.

While there have been described what are believed to be the preferred embodiments of the present invention, those skilled in the art will recognize that other and further modifications may be made thereto without departing from the spirit of the invention, and it is intended to claim all such changes and modifications as fall within the true scope of the invention.

What is claimed is:

1. An improved transmitter having protection from undesired out-of-band radiation caused by high frequency signal components in the signal to be transmitted, comprising:

first means for supplying a signal to be transmitted;

second means, responsive to said supplied signal and to a supplied control signal for developing a modified supplied signal having a selected high frequency portion reduced in amplitude compared to the remainder of said supplied signal by an amount determined by said control signal;

means for transmitting said modified supplied signal;

third means for developing a control signal representative of the undesired out-of-band radiation caused by transmission of said modified supplied signal and for supplying said control signal to said second means.

2. A transmitter in accordance with claim 1 wherein said third means includes means for sampling at least that portion of the transmitted signal which represents any out-of-band radiation and for developing said control signal therefrom.

3. A transmitter in accordance with claim 1 wherein said third means includes means responsive to said supplied signal for developing said control signal therefrom.

4. A transmitter in accordance with claim 3 wherein said third means includes the series combination of a low power transmitter and an out-of-band radiation detector, said low power transmitter being responsive to said supplied signal and said out-of-band detector developing said control signal.

5. A transmitter in accordance with claim 4 wherein said second means includes means for separating said selected higher frequency portion from the remainder of said supplied signal, a means responsive to said control signal for controlling the amplitude of said selected higher frequency portion relative to the remainder of said supplied signal, and means for combining said controlled higher frequency portion with the remainder of said supplied signal to develop said modified supplied signal.

6. A transmitter in accordance with claim 5 wherein said supplied signal is a monophonic signal.

7. A transmitter in accordance with claim 5 wherein said supplied signal is the (L-R) component of a supplied stereophonic signal.

* * * * *